(12) United States Patent
Zeng et al.

(10) Patent No.: US 8,767,339 B2
(45) Date of Patent: Jul. 1, 2014

(54) SPACING FLUCTUATION COMPENSATION

(75) Inventors: Qinghua Zeng, Fremont, CA (US); Ellis Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 91 days.

(21) Appl. No.: 13/424,640

(22) Filed: Mar. 20, 2012

(65) Prior Publication Data
US 2013/0250446 A1 Sep. 26, 2013

(51) Int. Cl.
*G11B 21/02* (2006.01)
*G11B 5/60* (2006.01)

(52) U.S. Cl.
USPC .......................................................... 360/75

(58) Field of Classification Search
None
See application file for complete search history.

(56) References Cited

U.S. PATENT DOCUMENTS

| 7,224,547 | B2 | 5/2007 | Suk | |
|---|---|---|---|---|
| 7,233,451 | B2 | 6/2007 | Baumgart et al. | |
| 7,486,459 | B1 | 2/2009 | Schreck et al. | |
| 7,508,617 | B1 | 3/2009 | Mak et al. | |
| 7,623,314 | B2 * | 11/2009 | Yamashita et al. | 360/75 |
| 7,701,479 | B2 * | 4/2010 | Colburn et al. | 347/224 |
| 2008/0100951 | A1 * | 5/2008 | Takahashi | 360/75 |
| 2008/0204923 | A1 * | 8/2008 | Yoon | 360/75 |
| 2008/0247073 | A1 * | 10/2008 | Park | 360/59 |
| 2008/0266704 | A1 * | 10/2008 | Kim et al. | 360/75 |
| 2009/0086367 | A1 * | 4/2009 | Taniguchi et al. | 360/97.02 |
| 2010/0073795 | A1 * | 3/2010 | Amano | 360/31 |
| 2010/0091637 | A1 * | 4/2010 | Klerk et al. | 369/124.1 |
| 2010/0142080 | A1 * | 6/2010 | Deng et al. | 360/75 |

OTHER PUBLICATIONS

Co-pending, U.S. Appl. No. 13/317,402, filed Oct. 17, 2011, "Head DFH Protrusion Shape Calibration by HDI Sensor," Siu Yin Ngan, et al., 33 pgs.
Co-pending, U.S. Appl. No. 13/424,617, filed Mar. 20, 2012, "Measurement of Spacing Fluctuation by HDI Sensor," Qinghua Zeng, et al., 28 pgs.

* cited by examiner

*Primary Examiner* — Peter Vincent Agustin
(74) *Attorney, Agent, or Firm* — Saile Ackerman LLC; Stephen B. Ackerman

(57) ABSTRACT

A method to compensate for spacing variations between a dynamic fly height (DFH) controlled read/write head and a rotating disk surface. Using a HDI sensor or equivalent indicator of touchdowns, a power profile is calculated for an arbitrary track on a disk. The profile tracks disk topography by recording touchdown power at each of a series of sectors into which the track is subdivided. The resulting power profile, smoothed and expressed as a function of sector position, substitutes for the usual constant TD power setting that provides only an uncompensated range of spacing variations. A fixed back-off spacing power is added to the power profile enabling the head to fly over the track at a constant spacing. The power profile can be calculated to account for various temperature and pressure conditions.

11 Claims, 6 Drawing Sheets

SPACING FLUCTUATION COMPENSATION

RELATED PATENT APPLICATION

This application is related to Ser. No. 13/317,402, filing date Oct. 17, 2011 and to Ser. No. 13/424,617, filing date Mar. 20, 2012, assigned to the same assignee as the current application and both of which are fully incorporated herein by reference.

TECHNICAL FIELD

This disclosure relates to the fabrication of hard disk drives (HDD), particularly to a method of measuring and controlling the spacing between a head and a disk.

BACKGROUND

As magnetic read/write heads have been required to deal with magnetic media having increasingly higher area density of recorded information, various methods have been developed to improve the capabilities of the head to read and write at those levels. Traditionally, the direction taken in trying to achieve the reading and writing of this high density information has been to decrease the spacing (i.e. the static fly height) between the disk and the slider in each new generation of products.

FIG. 1 is a schematic illustration showing a single suspension-mounted slider (the combination collectively termed a "head gimbals assembly (HGA)") positioned above a spindle-mounted, rapidly rotating magnetic hard disk during disk-drive operation in a hard disk drive, HDD, (or a spinstand) at ambient operating temperature. The suspension (101) holds the slider (10) at an angle above the surface of the spindle-mounted magnetic disk (400), producing a "fly height" (clearance) between the air bearing surface (ABS) (100) of the slider and the disk. A read/write head (600) is mounted within the slider. The rotation of the disk (400) is, by definition, into the leading edge of the slider, while the read/write head (600) is located at the trailing edge of the slider. The write-gap (30) (which the write magnetic field spans and contacts the disk) of the head (90) is "above" (i.e. to the trailing edge side of) the read-gap portion (30). The hydrodynamics of the air layer between the ABS and the rotating disk surface supports the slider at its fly height above the disk. In a dynamic flying height (DFH) type of system to be considered herein, a controllable heater element (35), is located adjacent to the write gap (90) and, by heating the region surrounding the gap, can cause protrusions (not shown) of the ABS (200) of the head portion relative to the undisturbed shape of the ABS when it is not heated. These protrusions will produce a characteristic shape (the protrusion profile) across the ABS, which will manifest itself in variations of the flying height of the ABS above the disk. It is to be noted that modern HDD systems contain multiple disks and multiple read/write heads that are aligned with each of the multiple disks. Therefore, the method to be discussed herein may be discussed in terms of a single disk and its head, but the method is in no way limited to a single head/disk combination and it may, by extension, be applied to a multiplicity of disks and their associated heads. Similarly, the steps required to implement the method as discussed herein are easily implemented in a single head/disk combination or, independently, in a multiple head/disk combination. Finally, all steps required to implement the method can be implemented in hardware or firmware incorporated within the HDD, the spin stand or the multiple disk HDD.

Consistent and rapid increase in the recording area density of hard disk drives requires a corresponding continuous decrease in the flying height of the slider or mechanical spacing between magnetic recording head and disk. After the FH was reduced to about 10 nm, further decrease in FH became extremely difficult. Now that the thermal expansion based technique of DFH has emerged, dynamic control of the flying height during disk rotation has become possible. This technology has been widely applied in the past several years. As the recording density approaches 150 Gbit/cm2 (1 Tbit/in2), the spacing must now be decreased to a range of 1 nm.

In order to reliably control the spacing through activation of the heater, it is necessary to have a feasible way of measuring the spacing while applying the power to the heater. Relative spacing change can be calculated based on the well-known Wallace equation that relates signal loss to spacing as a function of frequency. However, to determine the actual spacing, a reference point is needed. The reference point is usually taken as the point where the head touches the disk. It is defined as the zero of the spacing. The process of finding this reference point is called touch down (TD) detection. For better TD detection and potential real time monitoring of head/disk spacing, the head element typically also includes a head-disk interference (HDI) sensor (or, HDIs). This sensor is a resistive temperature sensor used to detect a temperature change in the head that is induced by changes in clearance during head vibrations or by a direct contact caused by contacting with disk asperities. Note that different sensor types exist, including PZT and LDV sensors. The HDIs signal (from whatever type sensor being utilized) has DC (low frequency) and AC (high frequency) components. When the slider flies at a low clearance, low frequency oscillation (the DC component) appears. When the slider contacts the disk and afterwards, a strong high frequency (the AC component) HDIs signal appears. Thus, the AC component of the HDIs signal is more sensitive to the slider/disk contact, and, therefore, it could be more effective for TD detection. After a reference point is found, a desired spacing can be set to a specified value, such as 1.5 nm for the current generation of drives, by adjusting the DFH power during reading and writing.

In the current generation of HDD's, the TD power and spacing at each zone is a constant. Unfortunately, the TD power and the spacing are actually not constant even along the same track. They fluctuate because the disk within the disk drive does not present a perfectly flat surface. For example, the disk typically has an initial distortion from disk manufacturing. After the disk is assembled into the drive, additional distortions or imperfections can be induced. At an inner diameter (ID) region, due to forces applied in clamping the disk, the disk might have a large local distortion. At an outer diameter (OD) region, due to a poor alignment, the disk might have a tilting relative to the slider. Both the force-induced distortion of the disk and its tilting due to misalignment will induce a spacing fluctuation at the same track. The fluctuation amplitude (max spacing-min spacing in one revolution at the same track) is dependent on the disk condition (distortion/tilting) and the slider air bearing surface design. It could range between 0.5 nm and 2 nm. When the spacing approaches the 1 nm range, this fluctuation becomes very significant. At the minimum spacing position, the slider might actually contact the disk, which causes a system failure if the contact occurs during a writing process. At the maximum spacing position, the total spacing is too large, and it can cause a "weak write" failure due to a large magnetic spacing and a magnetic field that is insufficient at the disk to create a proper write transition. For these reasons, the spacing fluctuation needs to be under control or compensated.

Mak et al. (U.S. Pat. No. 7,508,617), Schreck et al. (U.S. Pat. No. 7,486,459), Suk (U.S. Pat. No. 7,224,547) and Baumgart et al. (U.S. Pat. No. 7,233,451) have each commented on the need to provide such control or compensation, but do not appear to have provided such control or compensation in an effective manner or in the manner to be provided by the present disclosure.

In a related disclosure (Ser. No. 13/424,617, which is fully incorporated herein by reference), a technique to measure and characterize the spacing fluctuation inside of disk drives was disclosed by the present inventors. The technique provided in that disclosure can form the basis of an effective method to provide the spacing fluctuation control and compensation.

SUMMARY

A first object of the present disclosure is to provide a method of compensating for head-to-disk spacing fluctuations between a DFH read/write head and a disk rotating beneath it.

A second object of the present disclosure is to provide such a method that is based on measured touchdown (TD) power profiles determined by the analysis of power levels between the onset of touchdowns and complete touchdowns between the head and the disk.

A third object of the present disclosure is to provide a HDD in which the method resides in a HDD memory and can be regularly applied to provide compensation.

The measurement of TD power profiles, which is a prerequisite for the compensation of spacing fluctuations in accord with the present disclosure, will be achieved by using heat producing elements in a DFH-type slider mounted read/write head. These elements, when provided with a proper range of power levels, will provide systematic clearance variations to produce touchdowns between the head and disk surface during disk rotations, while an HDI sensor, also mounted within the slider, provides a response signal to indicate when and where touchdowns occur during those variations. The processing and analysis of these signals gives quantitative and qualitative evidence of the surface shape of the disk. The surface variations obtained in such a manner can be defined for all tracks in a disk. Then, these same variations can be used to adjust the power levels of the DFH head during read and write operations so that the head maintains a constant clearance and so that clearance fluctuations are effectively compensated. In the discussion below, we will present a brief description (see related application Ser. No. 13/424,617, which is fully incorporated herein by reference, for a more detailed description) of how the method can be used to obtain a TD response contour and then we will describe fully how the TD response contour is used in the present disclosure to provide a compensatory mechanism.

Referring to FIGS. 2a and 2b, there is shown an example of the application of the method. To create these figures, a disk was mounted on a spin-stand and the disk was rotated at 5400 rpm. A DFH-type slider was flown over the disk at an ID, and a "stair-like" regularly incremented DFH power pulse (as shown FIG. 2a) was applied to the slider.

Referring to FIG. 2b, there is shown the captured HDIs signal that was generated in response to this pulse. Each step of the DFH power pulse of FIG. 2a is about 0.1 second in duration with a small DFH power incremental, approximately 0.5 mW. Within each of the power steps, there are about 9 revolutions of the disk.

For the first 1.4 seconds, the amplitude of sensor signal is very small (at a low DHF power). The signal indicates that there is no slider disk contact. As the power increases to about 52 mW, small spikes begin to appear. This indicates that the slider contacts the disk intermittently, or the slider contacts some local spots on the disk at this power level. This is the first TD.

Referring next to FIGS. 3a and 3b, there is shown the details of the previous example, beginning at 1.4 seconds, when the first spikes began to appear in FIG. 2b. When the power increases further, stronger spikes appear, indicating the onset of more severe interference between the slider and the disk at same spots, and then even more spikes appear as the slider contacts still more spots.

When the DFH power is about 58 mW (at about 2.5 seconds), individual spikes can no longer be differentiated and the sensor signal appears continuous at its full height. This means that the slider is now contacting the disk all locations on the track. This is the full TD.

At each of the power steps described in FIGS. 2 and 3, the RMS (root-mean-square) value of the HDI sensor signal during the time duration of the power step was calculated and its maximum amplitude (Max. amplitude) was found. Then, ratio values, "Ratio", were defined and calculated as:

Ratio=(Max. amplitude)/(RMS value)

FIG. 4 show the graphical plot of Ratio (as defined above) vs. the DHF power supplied, in milliwatts (mW). Using this graph, we can clearly identify the first TD point ($1^{st}$ TD) and full TD point. These correspond to the first discrete spike of FIG. 2b and the point where the HDI signal becomes continuous. The power difference between the first TD (approx. 52 mW) and the full TD (approx. 58 mW) is the TD power fluctuation range of the tested disk track.

Typically, one knows the DHF power efficiency, i.e. the spacing change per mW, such as 0.13 nm/mW. Then, the spacing fluctuation range can be obtained. In this case, the TD power fluctuation is about 6 mW (58 mW−52 mW), so the spacing fluctuation is: 0.13 nm/mW×6 mW, or about 0.8 nm.

With even more sophisticated processing of the signal, more information about the spacing fluctuation profile is obtained. At each power step, the signal was divided into the number of revolutions made by the disk during that power step: eg., 9 revolutions for the 0.1 sec power step. The elapsed time for each revolution, Tr, is approximately: Tr=11.11 ms, for 5400 rpm rotation rate of the disk.

Next, each revolution can be sub-divided into Ns sectors, Ns=200 sectors in this instance for illustrative purposes. Within each sector, the ratio was calculated, so each revolution will have Ns ratio values corresponding to the Ns sectors. Averaging all ratio values over the 9 revolutions gave an averaged Ns ratio values for each power steps. Plotting all the ratio values for each of the power steps in one chart, produces a contour plot, as shown FIG. 5.

Referring to FIG. 5, there is shown three portions in the graph, a middle portion outlined by upper (20) and lower (10) curves. The lower portion of the graph, labeled (10), indicating lower values of the ratio, shows the graphed averages before the first TD occurs at an inner diameter (ID) of the disk. The middle portion of the graph, between (10) and (20), indicates a region of higher values of the ratio after the onset of the first TD at each of the sectors. The upper portion of the graph, labeled (20), also indicating lower values of the ratio, shows the graphed averages after the full TD occurs. From this figure, we can visualize not only the TD fluctuation range, but also the TD power profile. The power profile should be a direct indication of the disk distortion profile. The contour plot should be a direct indication of the disk distortion profile. We shall now show how these results can be used to compensate for spacing fluctuations in a way that meets the objects set forth above.

BRIEF DESCRIPTION OF THE DRAWINGS

The objects, features, and advantages of the present disclosure are understood within the context of the Detailed Description as set forth below. The Detailed Description is understood within the context of the accompanying figures, wherein.

Ratio=(Max. amplitude)/(RMS value), plotted vs. the DHF power.

Figure 1:
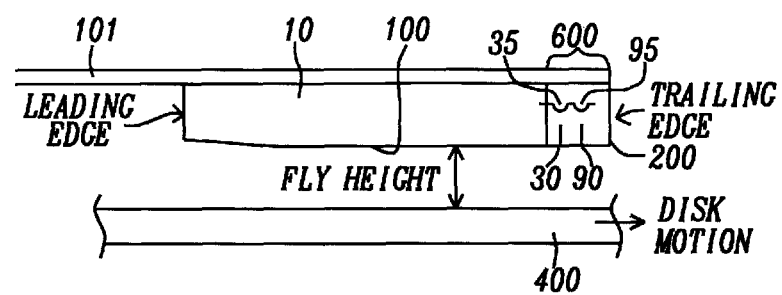
FIG. 1 is a schematic drawing illustrating a DFH-type slider-mounted read/write head positioned over a rotating disk.
Figure 2A:
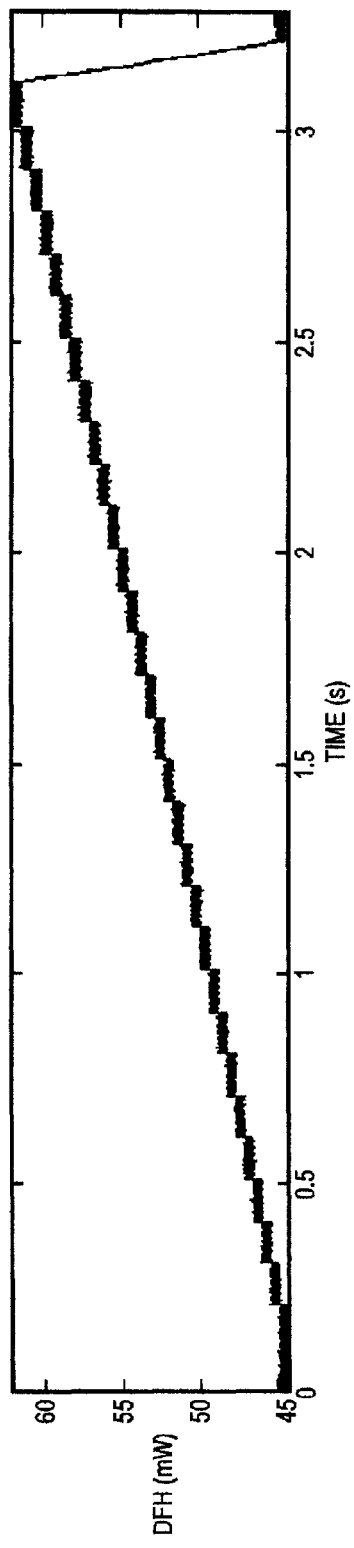
FIG. 2a and FIG. 2b are graphical illustrations showing, in 2a, a stair-shaped regularly incremented DFH heater power pulse and, in 2b, the response by a HDI sensor to that pulse.
Figure 2B:
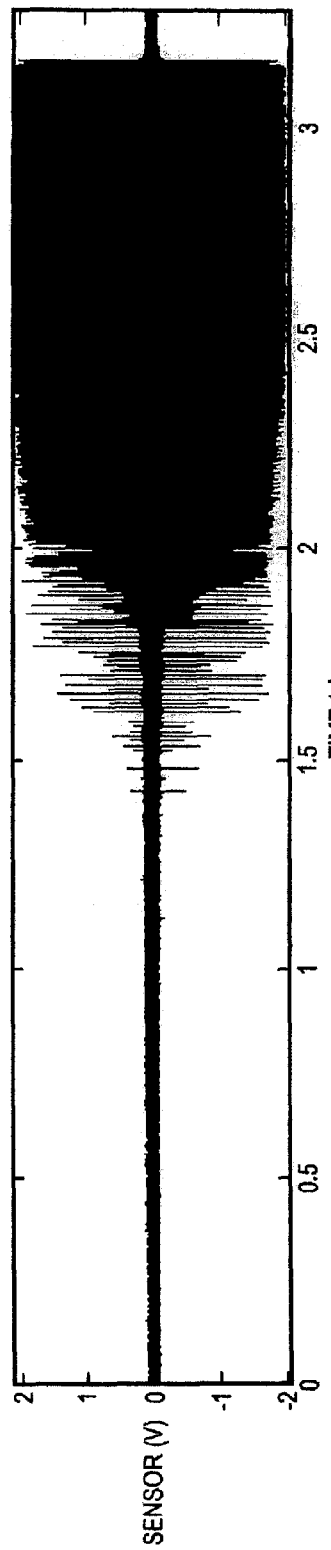
Figure 3A:
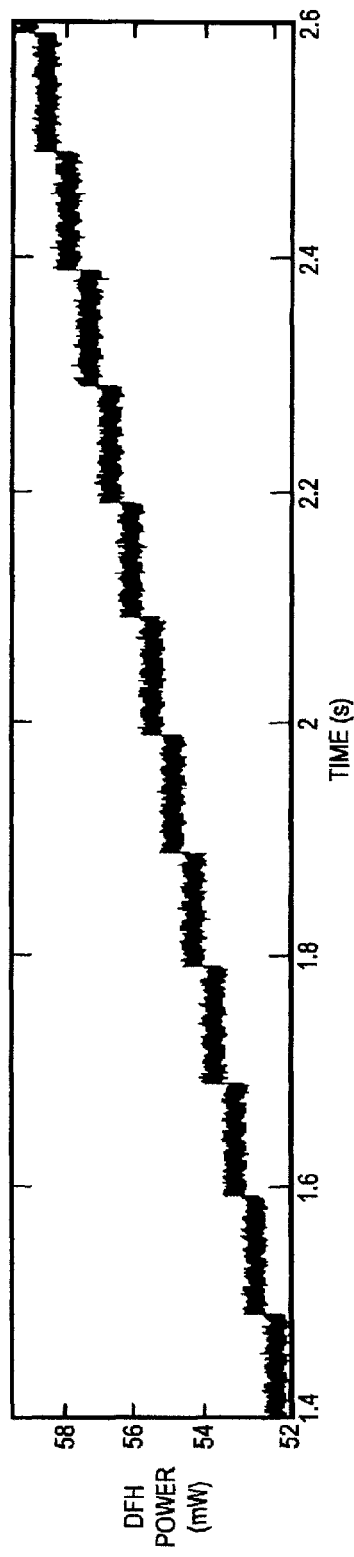
FIG. 3a and FIG. 3b are more detailed extensions of FIGS. 2a and 2b, showing the response of the HDI sensor as full touchdown is achieved.
Figure 3B:
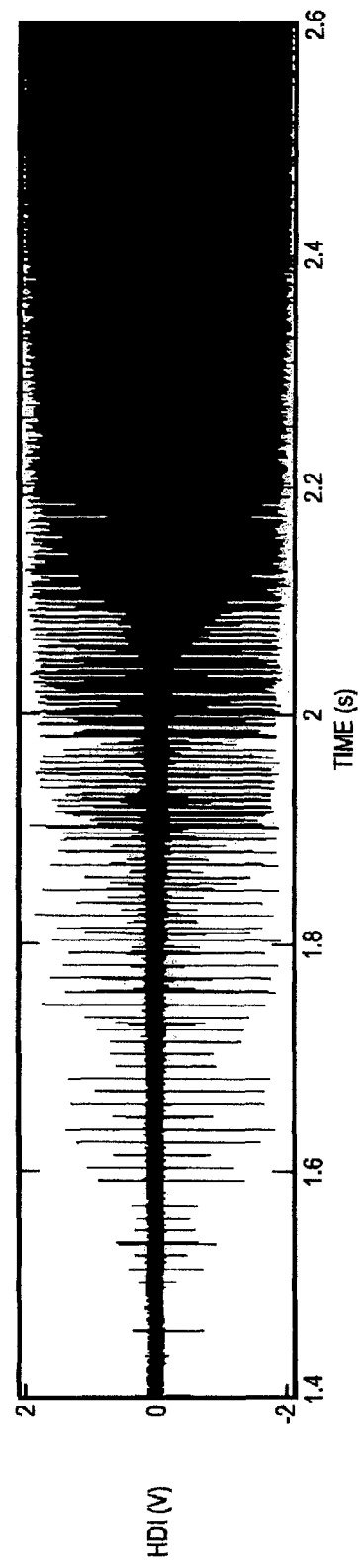
Figure 4:
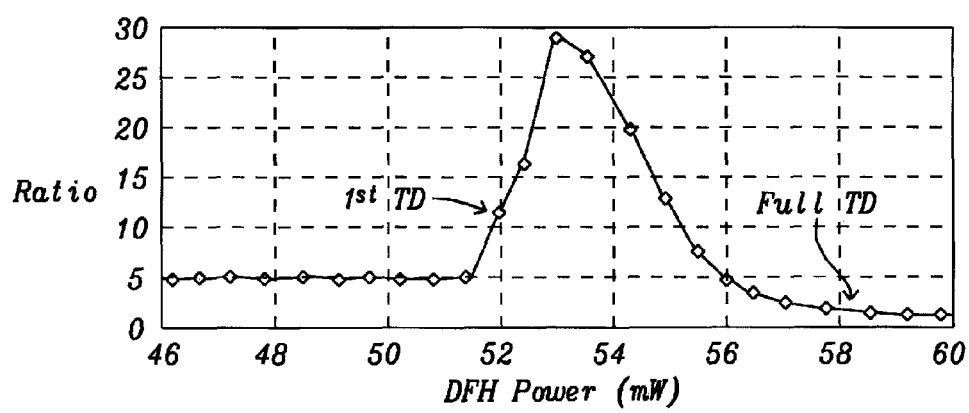
FIG. 4 is a graphical illustration of the relationship between a defined variable, "Ratio", which is the ratio of the maximum amplitude of the HDI sensor signal to its RMS value.
Figure 5:
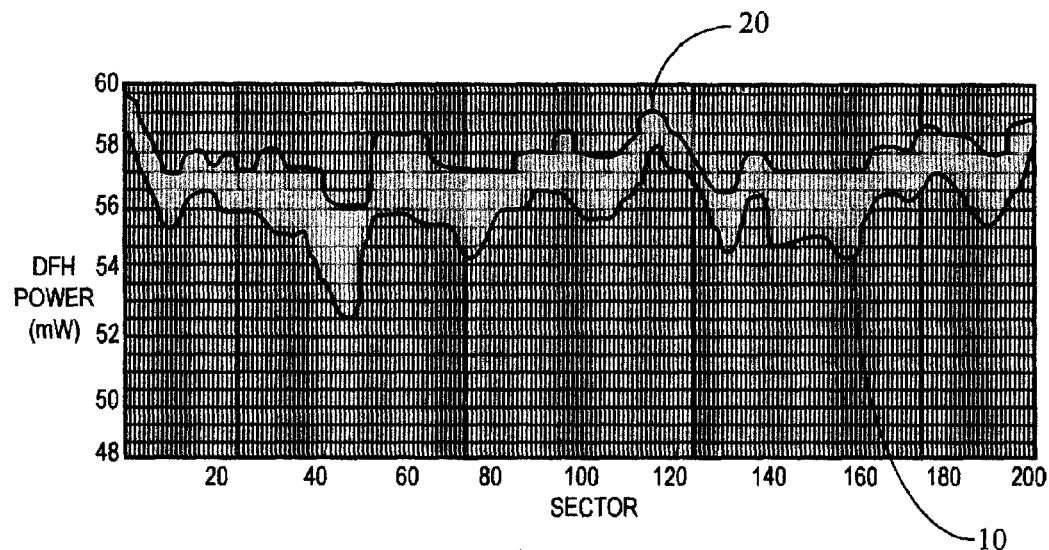

FIG. 5 is a graphical illustration of a TD response contour, which is a plot of a range, between first touchdown and complete touchdown, of average DFH power supplied to the slider vs. sector, for 200 sectors.

Figure 6:
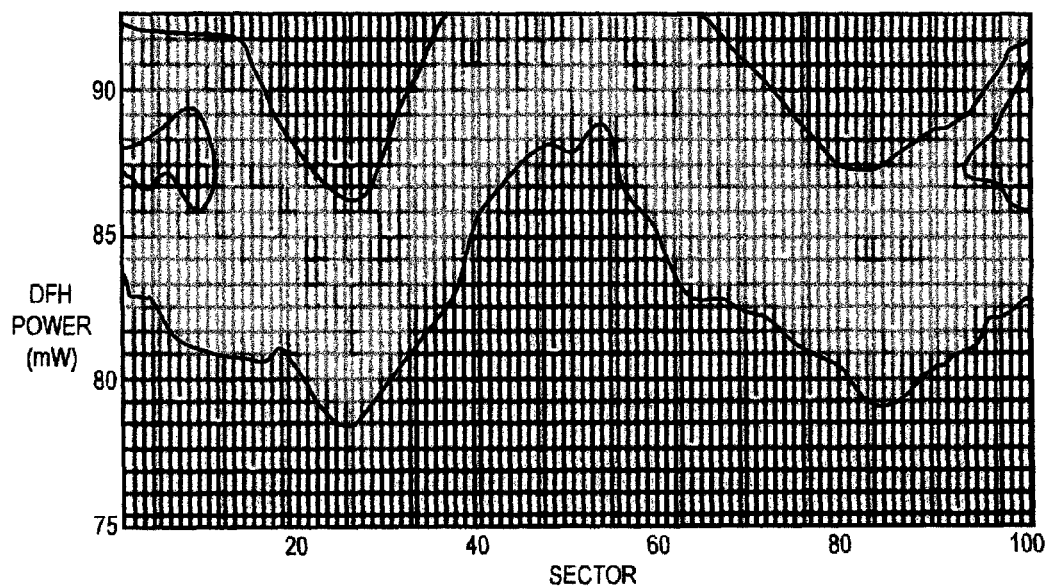

FIG. 6, like FIG. 5, is a graphical illustration of a TD response contour that shows the average range of DFH power between initial touchdown and complete touchdown as a function of sector along a track that has been subdivided into 100 sectors.

Figure 7:
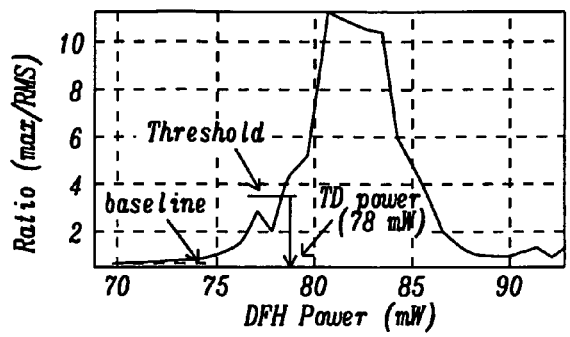

FIG. 7 is a graphical illustration of a TD response curve at sector 50 of the track in FIG. 6. The response curve is a plot of averaged Ratio vs. DFH power for a range of DFH powers between initial touchdown and complete touchdown. Once touchdown is complete, the Ratio no longer increases with increasing DFH power.

Figure 8A:
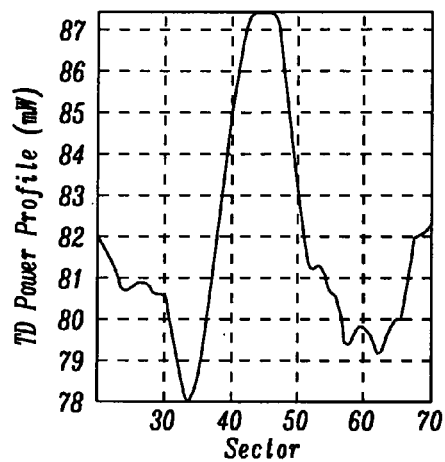
Figure 8B:
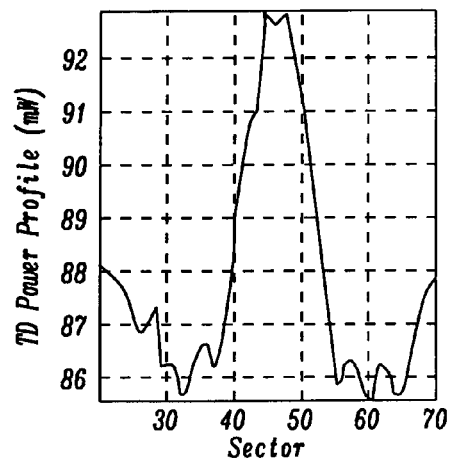
Figure 8C:
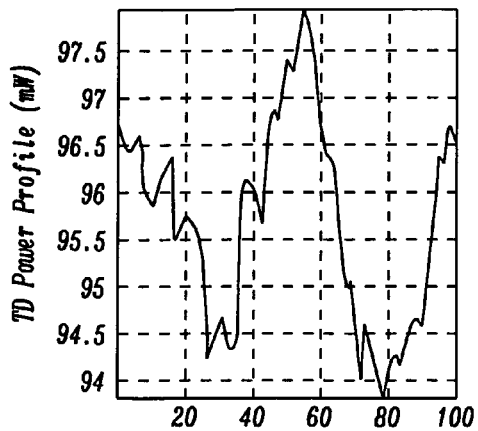

FIGS. 8a, 8b and 8c are plots of TD power profiles vs. sector, taken along an inner diameter track (8a), a middle diameter track (8b) and an outer diameter track (8c). The profiles display the variation in DFH energy required for a touchdown around the track.

DETAILED DESCRIPTION

Using the technique discussed above where a disk track was subdivided into 200 sectors, for ease of discussion we will now use a TD response contour as shown in FIG. 6, where a disk track is divided into 100 sectors. As before, the contour is constructed by combining the signal results corresponding to the power level before TD and after TD. From FIG. 6, we can roughly see the TD power fluctuation range and profile.

Referring now to FIG. 7 there is shown the TD curve (plot of Ratio vs. DFH power in mW) of sector 50. After setting an arbitrary threshold, (such as 4 times a baseline as shown), we can obtain the TD power for each sector on the track.

After combining TD power values of all 100 sectors into a single chart, a TD power profile was obtained for an inner diameter track as shown FIG. 8a. The curve was smoothed with a moving average, the value at each sector being the average over 3 continuous sectors.

Now, instead of having only a single TD power for each track (or zone), we have created a TD power profile for each track (or zone). At different tracks/zones, there are different profiles. FIG. 8b and FIG. 8c show the TD power profiles at MD (middle diameter) and OD (outside diameter) regions.

In current techniques, at a specified disk zone, there is a corresponding TD power, TDc, which is a constant. Assuming the DFH efficiency is E (nm/mW), if we want to have (for example) a 1.5 nm back-off in the spacing during writing (or reading), we would set the DFH power during writing, DFHw, as a constant value:

$$DFHw = TDc - 1.5/E \text{ (mW)} \quad (1)$$

Then, based on the results of FIG. 8a, the ID case (having about 9.9 mW TD power fluctuation top to bottom), the spacing fluctuation during writing could be as large as 1.3 nm: (minimum=back-off spacing 1.5 nm, and maximum=1.5+ 9.9*0.13 nm if E=0.13 nm/mW). This amount of fluctuation will significantly impact the performance of the HDD.

Using the measured TD power profile (TDprof) of FIG. 8a, the spacing fluctuation can be compensated directly. Assuming, again, that the DFH efficiency is E (nm/mW), if we want to have a 1.5 nm back-off spacing during writing, we can us the variable DFH power profile, DFHwprof, in (1) during writing, rather than the previously assumed constant DFHw, to obtain (2):

$$DFHwprof = TDprof - 1.5/E \quad (2)$$

Then, for DFHwprof taken from the FIG. 8a graph, the spacing fluctuation will be compensated, and a constant spacing (eg. 1.5 nm) over a whole track can be achieved, even with the effects of track distortions. This will significantly improve the performance. To obtain a general back-off spacing of s nm, we would use the formula (3):

$$DFHwprof = TDprof - s/E \quad (3)$$

In order to compensate correctly, the TD profile measurement and corresponding compensation need to have a "time" or "location" reference to initiate the compensation process. That reference can be the electrical signal of the spindle index or servo sector number. Either choice should be easy to implement in HDD drives.

The entire compensation process may be summed up in the following steps:

1. Divide disk into $N_z$ zones radially, 10 to 30 zones being preferred. Each zone has two boundary tracks (inner and outer radius), so the divided disk has $N_z+1$ boundary tracks.
2. Seek one boundary track, eg. track $T_{xi}$.
3. Apply a "stair-like" (eg. a stepped) DFH power pulse with the spindle index or sector number as a trigger (eg. a reference).
4. Measure the AC output of the HDI using, for example, a drive pre-amplifier in the HDD.
5. Process the HDI output of step 4 to obtain the TD power profile, TDprof ($T_{xi}$). Then, measure the DFH efficiency at the track $T_{xi}$.
6. Repeat steps 2 to 5 to complete the operation for all $N_z+1$ tracks, while saving and storing all values of TDprof($T_{xi}$) and all DFH efficiencies measured at those tracks.
7. During reading/writing operations, seek track $T_x$ on which the operation is to be performed. Based on the location of $T_x$, find its zone number and the two boundary tracks, ($T_{xs}$, $T_{xe}$) corresponding to that zone.
8. Perform an interpolation to determine TDprof for $T_x$ based on the values of TDprof determined at the boundary tracks ($T_{xs}$, $T_{xe}$) and determine the DFH efficiency at T.

9. Calculate the DFH power profile using DFHwprof=TDprof−s/E, triggered by the spindle index or the sector number, where E is DFH efficiency and s nm is the desired back-off spacing.
10. Perform the reading/writing operation.

Steps 1-6 can be performed during HDD manufacturing and then they can be repeated, as desired, at regularly scheduled (eg. every 6 months) intervals or whenever drive performance is deemed to have slipped below specified parameters. These steps need to be performed for each head in the HDD. The processed HDI signals as well as the results of the steps required for the compensation can be stored in hardware, firmware or software within the HDD and accessed during the read/write operations.

We note that factors affecting disk distortion and surface irregularities, such as disk clamping forces, can be affected by ambient temperature. We also note that altitude (eg. ambient pressure) can affect the air bearing crown sensitivity and, correspondingly, the spacing fluctuation. Therefore, to do a more thorough compensation, DFHprof can be measured under different ambient environmental conditions, such as different temperatures, T, and different altitudes, A, to create a function: DFHwprof(T,A). Then, during a read or write operation, the compensation can be performed using appropriate values of T and A in (4):

$$DFHwprof(T,A) = TDprof(T,A) - s/E \quad (4)$$

such as T=5, 30 60° C., A=10,000 ft. During actual reading and writing operations, interpolations can be done find TDprof (T,A) for any values of T and A required for compensation.

As is understood by a person skilled in the art, the preferred embodiment of the present disclosure is illustrative of the present disclosure rather than being limiting of the present disclosure. Revisions and modifications may be made to methods, processes, materials, structures, and dimensions through which spacing fluctuations of a DFH head are compensated, while still providing such methods; processes, materials, structures and dimensions in accord with the present disclosure as defined by the appended claims.

What is claimed is:

1. A method for compensating spacing fluctuations between a dynamic flying height(DFH) read/write head and a selected disk track during read/write operations in a hard disk drive (HDD), comprising:
   providing a hard disk drive (HDD) having at least one rotatable disk therein and a DFH head flyable above said disk;
   positioning said DFH head above a track selected for performing a read or write operation; then
   compensating for spacing fluctuations between said track and said DFH head during said read or write operation by a compensation method further comprising:
      setting a variable power profile value: DFHwprof=TDprof−s/E, where TDprof is a touchdown profile determined as a function of a sector subdivision of said track, where s is a desired back-off spacing and where E is DFH efficiency at said track; then
      choosing a track reference value to set an origin of said variable power profile value; and
      using said referenced power profile variable, DFHwprof, as the DFH power level along corresponding sectors of said track, performing said read or write operation.

2. The method of claim 1 wherein said TDprof is calculated at each sector using a three sector running average about said sector to eliminate measurement noise.

3. The method of claim 1 wherein said track reference is a spindle index or a servo sector location.

4. The method of claim 1 wherein said HDD is a multiple disk HDD having a plurality of disks and heads and wherein each of said plurality of heads and associated disks is separately compensated when performing a read or write operation on a track on said disk.

5. A method for compensating spacing fluctuations between a dynamic flying height (DFH) read/write head and an associated disk during read/write operations in a hard disk drive (HDD), comprising:
   providing a hard disk drive (HDD) having at least one rotatable disk therein and a DFH head flyable above said disk; then
   dividing said disk into $N_z$ zones radially, wherein each zone has two radially separated boundary tracks, whereby the divided disk has $N_z+1$ boundary tracks; then applying the following steps:
   a. seeking a boundary track, denoted track $T_{xi}$;
   b. applying a "stair-like" stepped DFH power pulse using a spindle index or sector number as a trigger;
   c. measuring a high-frequency output component of an AC signal provided by an HDI sensor, using, for example, a drive pre-amplifier in the HDD; then
   d. processing said HDI high-frequency output component to obtain a TD power profile along said track, TDprof $(T_{xi})$; then
   e. measuring a DFH efficiency at said track $T_{xi}$; and then
   f. choosing another boundary track and repeating steps b through f to complete the operation for all $N_z+1$ boundary tracks, while saving and storing all values of TDprof $(T_{xi})$ and all DFH efficiencies measured at those tracks; then
   g. during reading/writing operations, seek track $T_x$ on which the operation is to be performed;
   h. based on the location of $T_x$, find its zone number and the two boundary tracks, $(T_{xs}, T_{xe})$ bounding said zone; then
   i. perform an interpolation to determine TDprof for $T_x$ based on the values of TDprof determined at the boundary tracks $(T_{xs}, T_{xe})$ and determine the DFH efficiency at $T_x$;
   j. calculate the DFH power profile using DFHwprof=TDprof−s/E, triggered by the spindle index or the sector number, where E is DFH efficiency at track $T_x$ and s is the desired back-off spacing; then
   k. perform the reading/writing operation at track $T_x$.

6. The method of claim 5 wherein said DFH power profile is determined at a range of temperatures, T and altitudes, A in the functional form:

$$DFHwprof(T,A) = TDprof(T,A) - s/E,$$

which is then used in step j to provide compensation at a corresponding range of temperatures and altitudes.

7. A hard disk drive having at least one dynamic flying height (DFH) head and an associated disk that is compensated for variations in head to disk spacing during read or write operations, comprising:
   at least one spindle-mounted rotatable disk;
   at least one DFH head flyable above said at least one rotatable disk;
   a HDI sensor for detecting touchdowns and producing a high-frequency component of an AC signal indicating the detection of said touchdowns;

a memory and associated processing circuitry for processing and storing said detection signals;

a variable touchdown profile, TDprof, determined using said processed signals from said HDI sensor and said at least one disk, wherein said touchdown profile applies to each of a subdivision of sectors along each track selectable for a read or write operation on said at least one disk;

a variable DFH power profile, DFHwprof, which is a function of sector location along each of said sectors and which is applied to said DFH head when said DFH head flies above said selected track, said power profile being determined so that variations in spacing between said head and said track are compensated and said head maintains a substantially fixed spacing above said track.

8. The HDD of claim 7 wherein DFHwprof=TDprof−s/E, wherein TDprof is a track and sector dependent touchdown profile, s is a desired back-off distance and E is DFH efficiency at a corresponding track.

9. The HDD of claim 8 wherein DFHwprof is a function of temperature, T and altitude, A, of the HDD.

10. The HDD of claim 8 wherein TDprof as a function of track and track sector is measured by determining a touchdown power along said track sectors.

11. The HDD of claim 7 wherein said DFHwprof is referenced at a spindle index or by a servo location.

* * * * *